United States Patent [19]

Hardin

[11] Patent Number: 5,013,069
[45] Date of Patent: May 7, 1991

[54] GOLF SCORECARD

[76] Inventor: James D. Hardin, 205 Pasadena Dr., Lexington, Ky. 40503

[21] Appl. No.: 491,435

[22] Filed: Mar. 9, 1990

[51] Int. Cl.⁵ .............................................. G09B 19/22
[52] U.S. Cl. ..................... 283/48.1; 283/49; 273/32 H
[58] Field of Search ............... 283/48.1, 49, 50; 273/32 A, 32 B, 32 H, 87 F, 32 R, 176 L; 434/252

[56] References Cited

U.S. PATENT DOCUMENTS

| | | | |
|---|---|---|---|
| 1,447,358 | 3/1923 | Seguine, Jr. | 283/49 |
| 1,514,254 | 11/1924 | MacDonald | 283/50 |
| 1,558,838 | 10/1925 | Clark | 283/29 |
| 3,561,673 | 2/1971 | Kerestes . | |
| 3,805,411 | 4/1974 | Andrew, Jr. . | |
| 3,883,161 | 5/1975 | McGee et al. | 283/50 |
| 4,331,425 | 5/1982 | Davis, Jr. | 283/50 |
| 4,666,156 | 5/1987 | Wakisaka | 273/32 H |
| 4,666,157 | 5/1987 | Bodine et al. | 273/32 H |
| 4,745,875 | 5/1988 | Timleck . | |

OTHER PUBLICATIONS

Gentlemene Score Card.

*Primary Examiner*—Paul A. Bell
*Assistant Examiner*—Hwei-Siu Payer
*Attorney, Agent, or Firm*—King and Schickli

[57] ABSTRACT

A golf scorecard is provided that not only allows the maintaining of individual and team stroke scores but also a simple and standardized format for maintaining game point totals. More particularly, the golf scorecard is formed of sheet material adapted for receiving indicia. The card includes a series of four player identification blocks for the entry of player names. A row of score boxes is aligned with each of the player identification blocks. An individual player stroke total may be recorded in each of the score boxes with one score box being provided for each hole of the golf course being played. The golf card also provides a plurality of rows of game point blocks formed on the sheet for recording individual player game points. Preferably, at least one game point block is provided in each score box. The scorecard also includes team original game point blocks, skins letters, team new game point blocks, press letters and round robin blocks so as to enable golfers to maintain a standardized scoring system for any number of golf games including those most commonly played by the golfing public: Nassau, low ball, low ball and low total, scotch, bingo bango bongo, robins and skins as well as presses.

17 Claims, 6 Drawing Sheets

GOLF SCORECARD

TECHNICAL FIELD

The present invention relates generally to the game of golf, and more particularly, to a unique scorecard specifically adapted for maintaining the stroke totals and game point totals of individual golfers playing any number of different golf games.

BACKGROUND OF THE INVENTION

The sport of golf is presently undergoing a rapid rise in popularity. Each of the last few years has witnessed a substantial increase in the number of golfers as well as in the construction of new golf courses to meet demand.

Over the years, a number of different scorecards have been developed to not only aid golfers in maintaining their stroke total but also to provide golfers with information relative to the holes of the golf course being played. For example, U.S. Pat. No. 4,331,425 to Davis, Jr. and U.S. Pat. No. 3,883,161 to McGee et al both relate to a combined scorecard and booklet. The booklet provides various information with respect to the holes of the golf course being played including the layout of the hole, the distance from the tees, sand traps, and other landmarks to the greens and the pars for the individual holes. Golf cards developed to date, however, do not provide scoring blocks for receiving indicia to score the various golf games that have been developed through the years, such as Nassau, low ball, low ball/low total, bingo bango bongo, skins, scotch and robins. Accordingly, individuals must devise their own marking system to maintain the game totals on these cards.

Disadvantageously, individually devised marking systems vary from person to person and accordingly, it is difficult for others than the actual scorer to determine the game standing from a quick review of the scorecard. Additionally, the extra markings required for maintaining game totals on a typical scorecard are confusing. The scorecard also often becomes quite messy as the cards are not provided with areas to maintain game totals. Consequently it is often frustrating to play these additional games and it is time consuming to maintain the scorecard. This, unfortunately, leads to slower play which inconveniences all of those on the golf course.

A need is therefore identified for an improved scorecard that not only allows the maintaining of the individual golfer's stroke total but provides a simplified format for maintaining and tabulating game point totals that is standardized so that all those familiar with and reviewing the card may readily determine the individual's game score.

SUMMARY OF THE INVENTION

Accordingly, it is the primary object of the present invention to provide a golf scorecard with a simple layout that may be utilized to concisely and effectively record stroke totals and game point totals for individual golfers and golf teams.

Yet another object of the present invention is to provide an easy to use scorecard that provides a standardized method for scoring games so that any player can look at the card and understand the scoring of each game being played.

Yet another object of the present invention is to provide a golf scorecard presenting a simplified scoring system providing a neat, clear presentation of information. Advantageously, the card serves to motivate golfers to learn new and different point games thereby increasing the interest in the game of golf and fellowship among the golfers playing the game.

Yet another object of the present invention is to provide a golf scorecard having a unique scoring system for the various known golf games that effectively serves to speed play by simplifying the scoring procedure.

Additional objects, advantages, and other novel features of the invention will be set forth in part in the description that follows and in part will become apparent to those skilled in the art upon examination of the following or may be learned through the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a new and improved golf scorecard is provided for maintaining individual and team stroke totals as well as individual and team game point/totals in a standardized fashion. The scorecard comprises sheet material such as heavy paper stock designed for receiving indicia. Printed on the card is a numerical listing of the individual holes of the golf course being played as well as additional information for each hole setting forth the overall distance from tee to green, par and handicap. Also printed on the scorecard are four player identification blocks. Adjacent each player identification block is a handicap block for recording a player's individual stroke handicap.

A plurality of n rows of score boxes are formed on the sheet material by printing. One row of score boxes is provided aligned with each player identification block. Additionally, one score box in each row is provided aligned with each numerical listing for an individual hole on the golf course. Accordingly, the individual identified in a particular player identification block may record his or her individual stroke total for a particular hole in the score box aligned with the appropriate player identification box and hole numerical listing on the scorecard. Such a score box is provided on a traditional golf card as is known in the prior art.

A plurality of n rows of individual game point blocks are also formed on the sheet as, for example, by printing. Each game point block allows the recording of individual player game point totals. As with the score boxes discussed above, one row of game point blocks is provided aligned with each player identification block. Additionally, one game point block in each row is aligned with each numerical listing for a hole so that the game point totals for the game or games being played may be recorded on the scorecard at the completion of each golf hole.

In accordance with another aspect of the present invention, the golf scorecard also includes a row of team original game point blocks. These blocks are also formed on the sheet as, for example, by printing. The team original game point blocks allow the reporting of team game point totals for the original game being played by the golfers. Once again, as discussed above, one team original game point block is provided aligned with each golf hole numerical listing presented on the scorecard.

The golf scorecard also includes a plurality of m skins letters. One skins letter is provided in each score box.

The marking of any of the skins letters indicates that the corresponding player has won a skin on the corresponding hole as described in greater detail below.

In accordance with yet another aspect of the present invention the scorecard has a plurality of p rows of team new game point blocks formed on the sheet as, for example, by printing. The team new game point blocks allow the recording of team game point totals for each new game started off the original game.

Additionally, the scorecard includes a plurality of q press letters. One press letter is positioned adjacent to each initial block of each row of team new game point blocks. The marking of any of the press letters indicates that a press begins on that hole off of the original game. A press allows a losing player or team to recover on the original game by starting a new, secondary game off the original.

The scorecard also includes a series of r round-robin blocks. These blocks are also formed on the card by printing. The marking of the round-robin blocks indicates the pairing of partners for a particular set of holes. Where four players are involved three six hole robins are played during an eighteen hole round with all players being paired once. Alternatively, six three holes robins may be played during an eighteen hole round with all players being paired twice.

Advantageously, the golf scorecard of the present invention allows individuals to maintain both individual and team stroke and game point totals in a simple, concise, accurate and standardized fashion. Due to the convenience provided, the golf scorecard of the present invention effectively increases player interest in the various golf games that have been developed over the years thereby increasing the camaraderie between players as well as their interest in the game of golf. Further, by providing a scoring format that is easy to learn and follow, the scorecard promotes quicker play from which everyone on the golf course benefits through a significant reduction in the time necessary to play a round of golf.

Still other objects of the present invention will become readily apparent to those skilled in this art from the following description wherein is shown and described a preferred embodiment of this invention simply by way of illustration of one of the modes best suited to carry out the invention. As it will be realized, the invention is capable of other different embodiments, and its several details are capable of modifications in the various, obvious aspects all without departing from the invention. Accordingly, the drawings and description will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing.

Reference will now be made in detail to the present preferred embodiment of the invention, an example of which is illustrated in the accompanying.

DETAILED DESCRIPTION OF THE INVENTION

Figure 1:
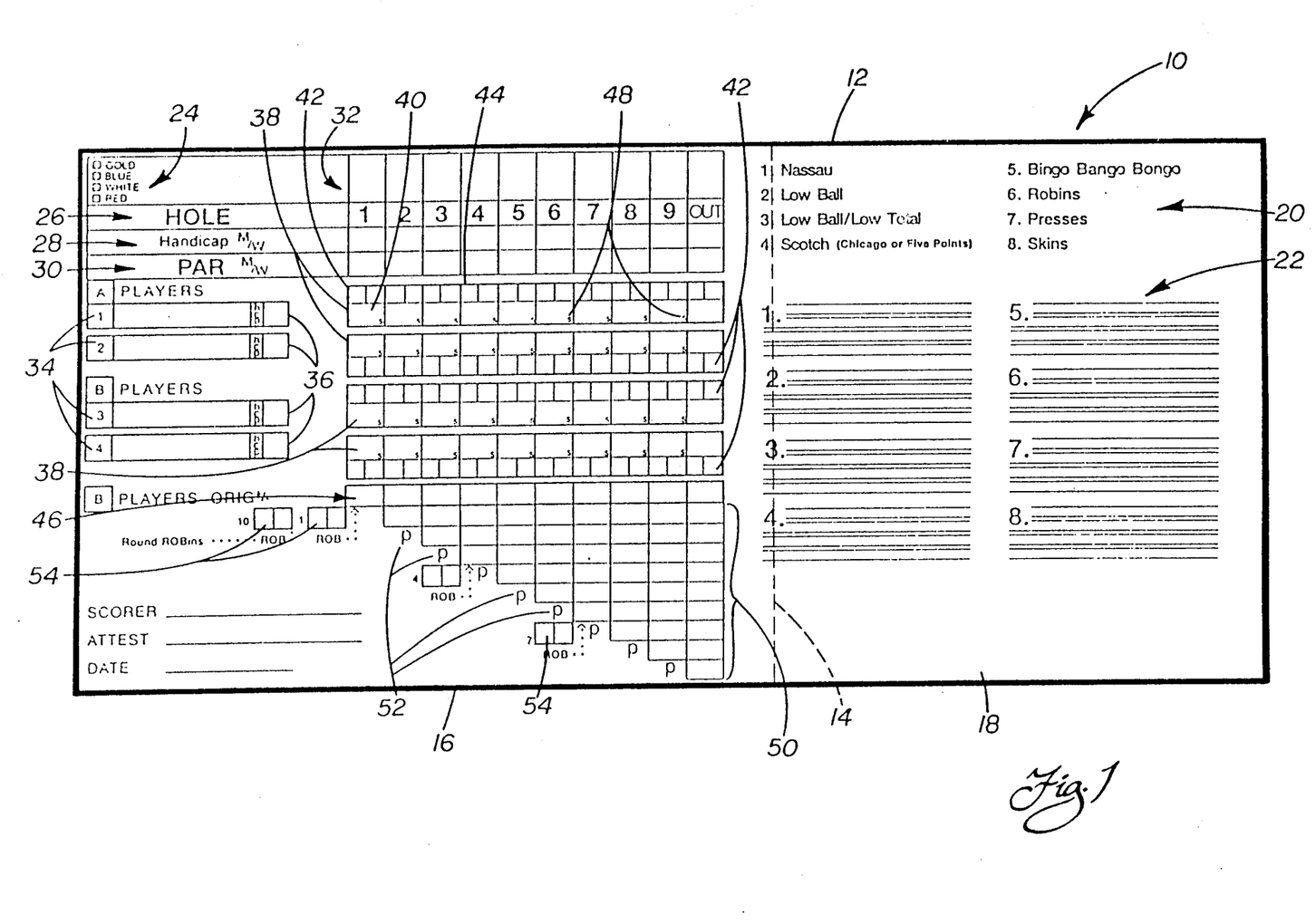
FIG. 1 is a plan view of one side of the scorecard of the present invention.
Figure 2:
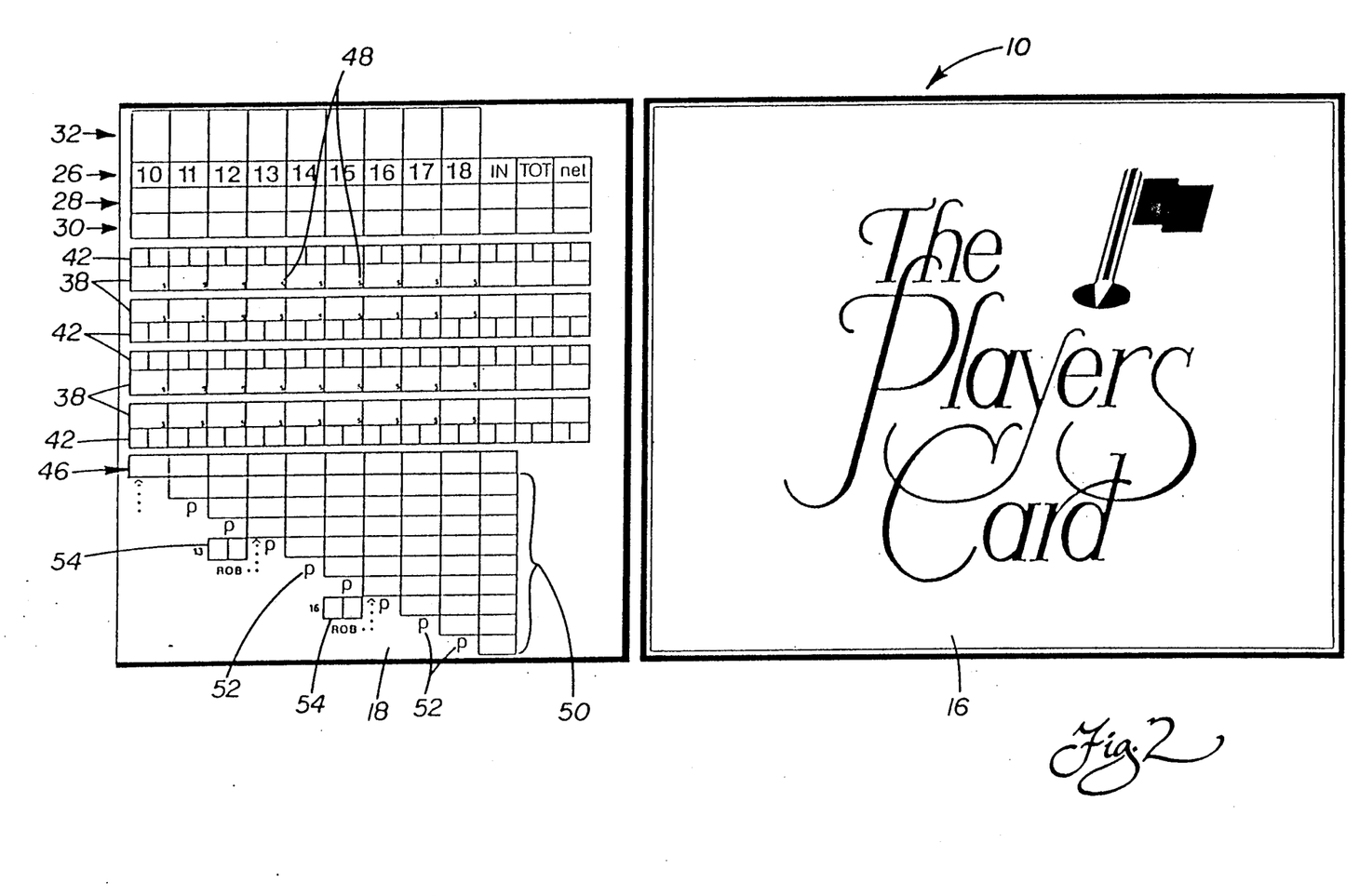
FIG. 2 is a plan view of the opposite side of the scorecard of the present invention.
Figure 3:
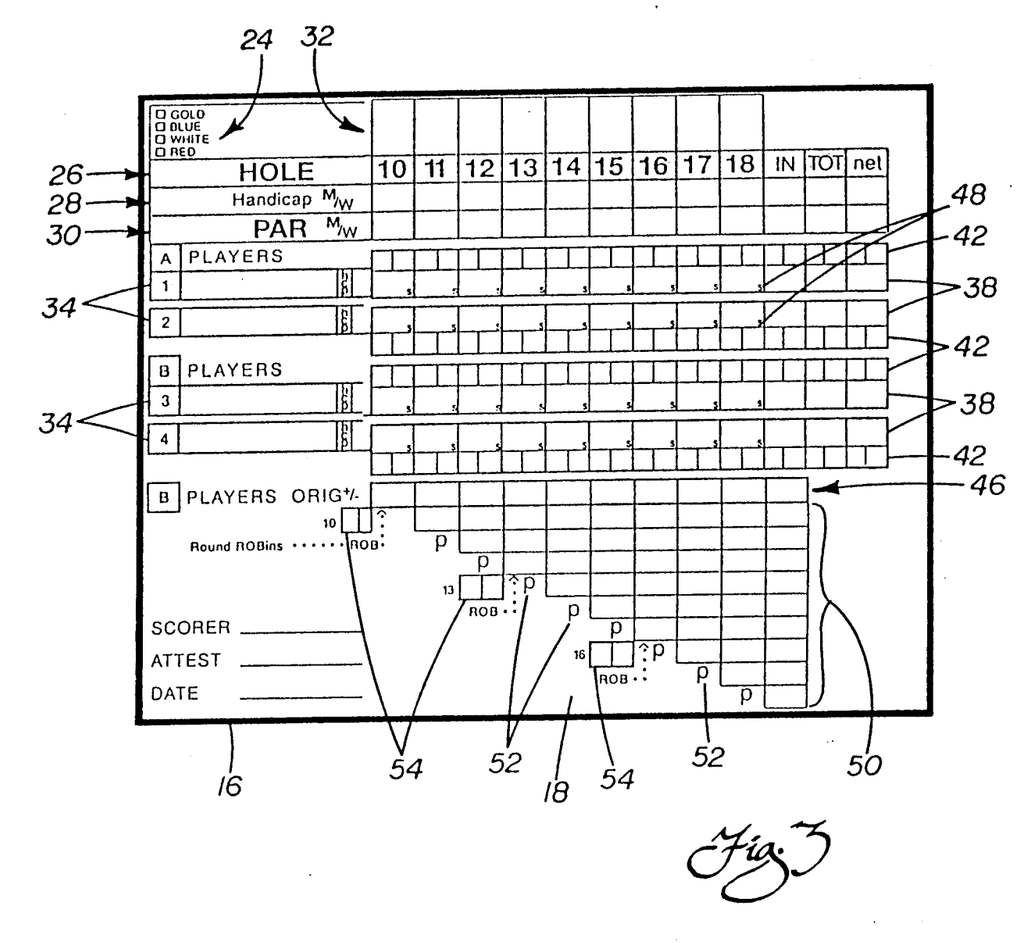
FIG. 3 is a plan view of the scorecard of the present invention folded so as to align scoring blocks for the golf holes 10-18 with the player identification blocks to allow proper scoring for the back 9 holes of play.

Reference is now made to FIGS. 1-3 showing the golf scorecard 10 of the present invention. The golf scorecard 10 comprises a sheet of material 12 such as heavy stock paper board designed for receiving scoring indicia. A fold line 14 is provided across the sheet material 12. The fold line 14 divides the sheet material 12 into two panels 16, 18. As best shown in FIG. 2, the front face of panel 16 includes an area for the printing of general information which for purposes of illustration is shown with the product designation "The Players Card." Alternatively, the individual golf course utilizing the scorecard 10 may desire to have this face of the panel printed with the name of the course and, perhaps, in the background a scenic view of one hole of the course or the clubhouse.

When the scorecard 10 is open about the fold line 14 as shown in FIG. 1, the front face of the panel 18 is adjacent to the rear face of the panel 16. The front face of the panel 18 may be printed with various information. As shown in the figure, the front face of the panel 18 includes a listing 20 of the 8 most popular golf games played in the United States. Below that list and shown schematically at 22 is a brief explanation of each of the golf games.

As shown in FIG. 1, the rear face of the panel 16 provides a scoring area for the first 9 holes of the golf course as described in greater detail below.

After the first 9 golf holes have been played, the scorecard 10 is folded about the fold line 14 so as to bring the rear face of the panel 18 over the rear face of the panel 16 as shown in FIG. 3. The rear face of the panel 18 is provided with a scoring area for the back 9 holes of the golf course (i.e. holes 10-18). This scoring area is described in greater detail below.

As best shown in FIG. 1, the scorecard 10 may be printed with tee identification boxes 24. The box corresponding to the particular tees of the golf holes being played by the golfers using the card may be checked to maintain an accurate record. Also printed on the card 10 in a row 26 is a numerical listing of the holes of the golf course. The listing for holes 1-9 appears on the rear face of the panel 16. The listing for holes 10-18 appears on the rear face of the panel 18. A row 28 is also provided for indicating the handicap for each golf hole 1-18 as is known in the art. A similar row 30 of boxes is provided for indicating the par of each golf hole. An additional row 32 of boxes is provided for indicating the yardages of each hole from each of the various tees (i.e. gold, blue, white, red). The par, hole handicap and yardage rows are provided on traditional golf cards as are known in the art.

A series of four player identification boxes 34 are provided on the left-hand portion of the rear face of the panel 16. The individual player's names are entered into these boxes with the players forming team A entered in the first two boxes and the players of team B entered in the second two boxes. For utmost convenience, one handicap block 36 is provided adjacent each player identification box for recording a player's stroke handicap. This makes it easy to determine and confirm the appropriate holes for which a player's stroke handicap may be applied in accordance with the rules of golf.

A plurality of n rows of score boxes 38 are also printed on the sheet 12 for recording a player's individual stroke total. As shown, one row of score boxes 38 is provided aligned with each player identification box 34 with an individual score box being provided aligned under each numerical hole listing. In this way an individual player can record his or her stroke total for each and every hole of the golf course by simply writing the appropriate number in the corresponding box. For example, if player 1 requires 4 strokes to complete the first hole, a 4 is entered in the box 40.

A plurality of n rows of individual game point blocks 42 are printed on the sheet material 12 for recording individual game points. Preferably, two such individual game point blocks 42 are provided within each score box 38. These boxes allow the recording of individual player game points. For example, if player 1 wins an individual game point such as "low ball" on the 5the hole, that game point may be entered in the individual game point block 44.

A row of team original point blocks 46 is also printed on the sheet material 12. As shown, one team original point block is provided aligned under each numerical listing for the golf holes 1-18. These blocks allow for the recording of team game points for the original game as will be described in greater detail below.

The scorecard 10 may also be provided with a plurality of m "skins" letters 48 shown as a "s" in the drawing figures. One skins letter is provided in each score box. The marking through of any skins letter 48 indicates that the corresponding player has won a skin on the corresponding hole. Thus, for example, if player 1 wins a skin on the first hole, the s in box 40 is marked through as shown.

The scorecard 10 also includes a plurality of p rows of team new game point blocks 50. These blocks allow the recording of team game points for each new game started off the original game as described in greater detail below.

The golf scorecard 10 further includes a plurality of q press letters 52 shown as a "p" on the scorecard. One press letter 52 is positioned adjacent and just below each initial block of each row of new team game blocks. The marking of any press letter indicates that a press begins on that hole off the original game.

Finally, the golf scorecard 10 also includes r round-robin blocks 54. The marking of these blocks with the numbers 1, 2, 3, or 4 indicates the pairing of playing partners for a particular set of 3 or 6 holes by referencing back to the player identification blocks 34.

The utilization of the golf scorecard 10 of the present invention in scoring 8 of the most popular golf games played in the United States will now be described in detail. It should be recognized, however, that as many as 78 other, not so well known golf games may be effectively scored utilizing this invention. Accordingly, it should be appreciated that the following description is being provided simply as an example to show the utility of the invention and the invention is not to be considered as limited thereto.

Figure 4:
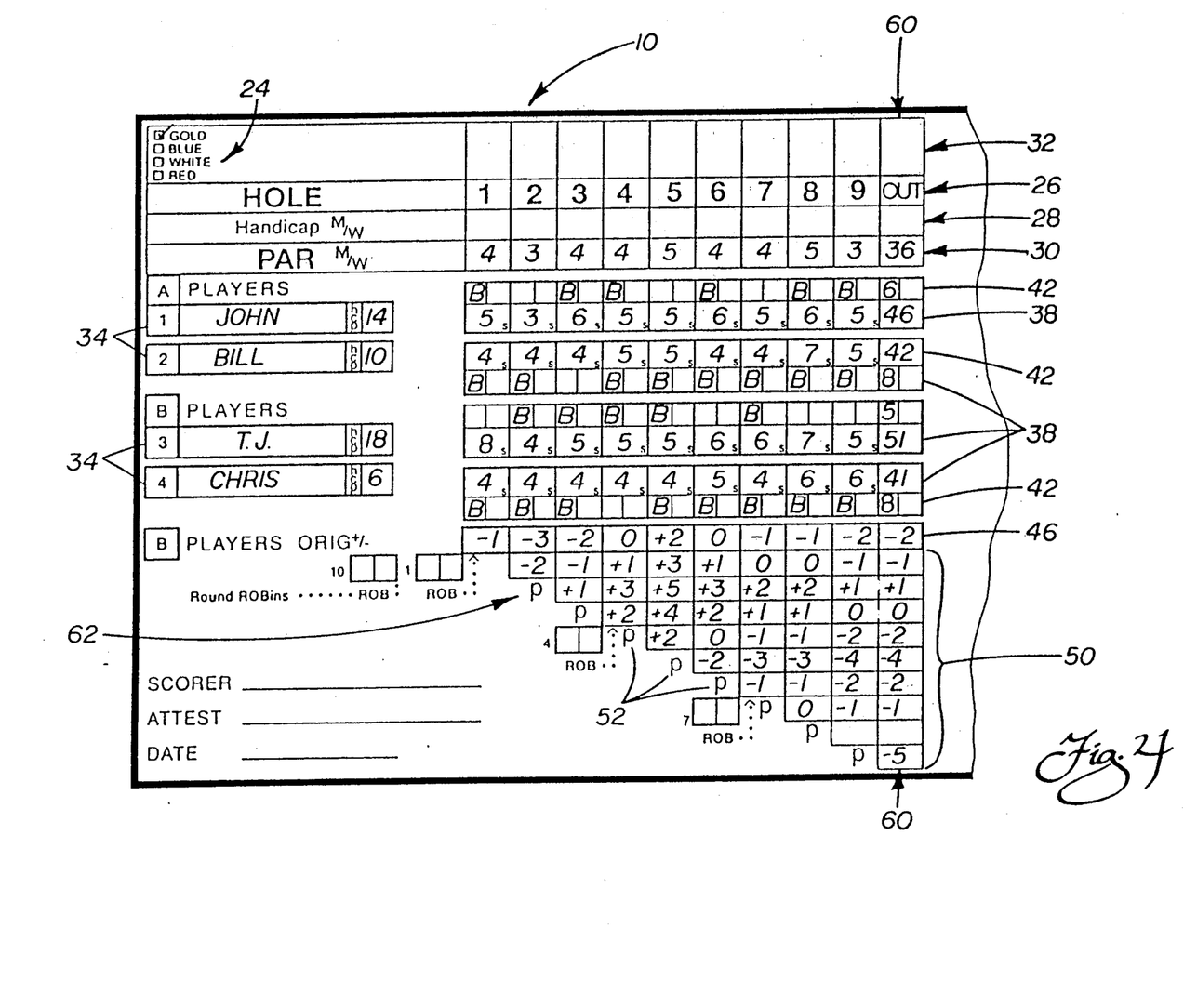
FIGS. 4, 5 and 6 are plan views of the scoring blocks for the first 9 holes of play that provide scoring examples for the explanation of the utilization of the golf scorecard of the present invention.

FIG. 4 shows a scorecard 10 that has been filled out through 9 holes for 4 individual golfers to demonstrate the scoring of the games Nassau, low ball/low total, bingo bango bongo, and skins including presses. Each of these games is well known to the golfing public and, accordingly, only a brief description of their play will be provided herein.

In the game of Nassau, a point value is assigned for winning the front nine holes (i.e. holes 1-9), the back nine holes (i.e. holes 10-18) and the entire 18 holes. A Nassau is scored by either match play, that is a team earns a point for each hole for which it has the lowest stroke total, or medal play, that is the stroke total for the team for each of the holes as totaled. In this description we will utilize medal play. As should be appreciated, team A composed of players John and Bill has a total of 88 strokes on the first nine holes (46+42). Team B, composed of players TJ and Chris has a stroke total of 92 for the first nine holes (51+41). Accordingly, the team A players John and Bill won the Nassau on the front nine. Stroke totals for the individual team members for holes 10-18 are added together in a similar manner to determine the team total for the back nine. The totals for the two teams are then compared to determine a winner on the back nine Nassau. The total number of strokes are also added for the entire 18 holes to determine a winner for the entire 18 hole Nassau.

In lowball/low total, one game point is awarded for the low stroke score on each hole and one game point is awarded for the low team stroke total for each hole. The game point total for the original nine hole game is shown in the team original game point blocks 46. For example, on the first hole Bill of team A and Chris of team B tied with a low ball score of 4. Accordingly, no low ball game point was awarded on the first hole. Team A did, however, have a low total of 9 strokes (5+4) versus 12 strokes (8+4) for team B. Accordingly, team B is down 1 point to team A after the first hole and a −1 is recorded in the first team original point block. For hole 2, team A won a game point for low ball (3 strokes versus 4 strokes) as well as a game point for low total (7 strokes versus 8 strokes). Accordingly, team B drops two more game points to team A and when these two game points are added to the game point dropped on the first hole a −3 is recorded in the second team original game point block beneath the numerical listing for the second hole. The tabulation of game points for the low ball and low total continue for each hole in this same manner and are recorded in the same way with the result that for the scores shown in FIG. 4 team A beats team B by two points on the first nine holes.

In bingo bango bongo, one game point is awarded for the first player on the green, one game point is awarded for the player closest to the pin, and one game point is awarded for the first player to sink a putt in the hole. Accordingly, in this game each player has a chance to win a maximum of 3 points per hole. Points won by a player on any given hole are scored in the individual game point blocks 42 by making an appropriate mark such as a "B" as shown in FIG. 4. The individual game points may then be totaled in the out column 60 to determine an individual and/or team winner.

A "press" is a means by which a losing player/team attempts to recover on an original game by starting a new/secondary game off the original. Under the most commonly played rules, presses cannot be declared unless A or B team players have lost points on the proceeding hole. Presses may be played on any original game that involves the scoring of points, therefore, presses could be played on any of the games being described.

The presses are noted at the "p" symbols designated by the reference numeral 52. A "p" is found under the first team new game block of each hole (2-9 and 11-18). When the center of the "p" is darkened with a writing instrument such as a pencil, a press or new/secondary game begins on that hole to the completion of the first nine holes. The team new game blocks 50 are provided to allow the recording of the game points won or lost by the B team players on each press or new/secondary game off the original game through the completion of the front nine holes. A similar series of boxes are provided for the back nine holes and are utilized in the same manner.

In the example shown in FIG. 4, the press is being described in conjunction with the low ball/low total game. Thus, for example, following hole 1, the losing B team presses darkening in the p designated at 62. Accordingly, a new game begins on hole two and runs through hole 9. On hole 2 as described above the A team wins both the low ball and low total game points, and accordingly, a −2 is recorded in the first new game box of the first new game row. Recording for each of the holes continues in this new game row with an end result that in the first new game the B team loses the press by 1 game point.

As shown in FIG. 4, presses were declared to begin new/secondary games on holes two through eight. Since hole eight was a draw, neither team could press and declare a new/secondary game beginning with hole nine. The final results of the first nine holes, as shown, is that the B team loses the original and five press or new/secondary games, ties one press game and wins one press game. The net results would be that the B team players lose a total of 5 games. The press option will, of course, continue on the back nine holes of golf thereby enabling the losing team the opportunity to recover by winning several press games.

The final game demonstrated in FIG. 4 is the skins game. In the skins game each hole is assigned a point value, and the player that wins the hole outright with the lowest score (with or without stroke handicap) wins the points. If two players tie, the points are carried over to the next hole.

This game may also be played as an individual point game where each player has a chance to win the assigned point value per hole with the lowest score. A point won by any player on any given hole is scored by marking through or shading out the small "s" (note reference no. 48) that is found in the lower-right hand corner of that player's score box for that hole. When the s is shaded a distinctive triangle may be formed in that player's actual score box. Such a marking is easily recognizable and aids those reviewing the card to identify the holes on which skins were won at any time during or after the round. Again, using the scorecard 10 in FIG. 4 for illustration, it is found that the player John won a skin on the second hole, the player Bill won a skin on the sixth hole, the player TJ did not win a skin and the player Chris won a skin on the fourth and fifth holes.

Figure 5:
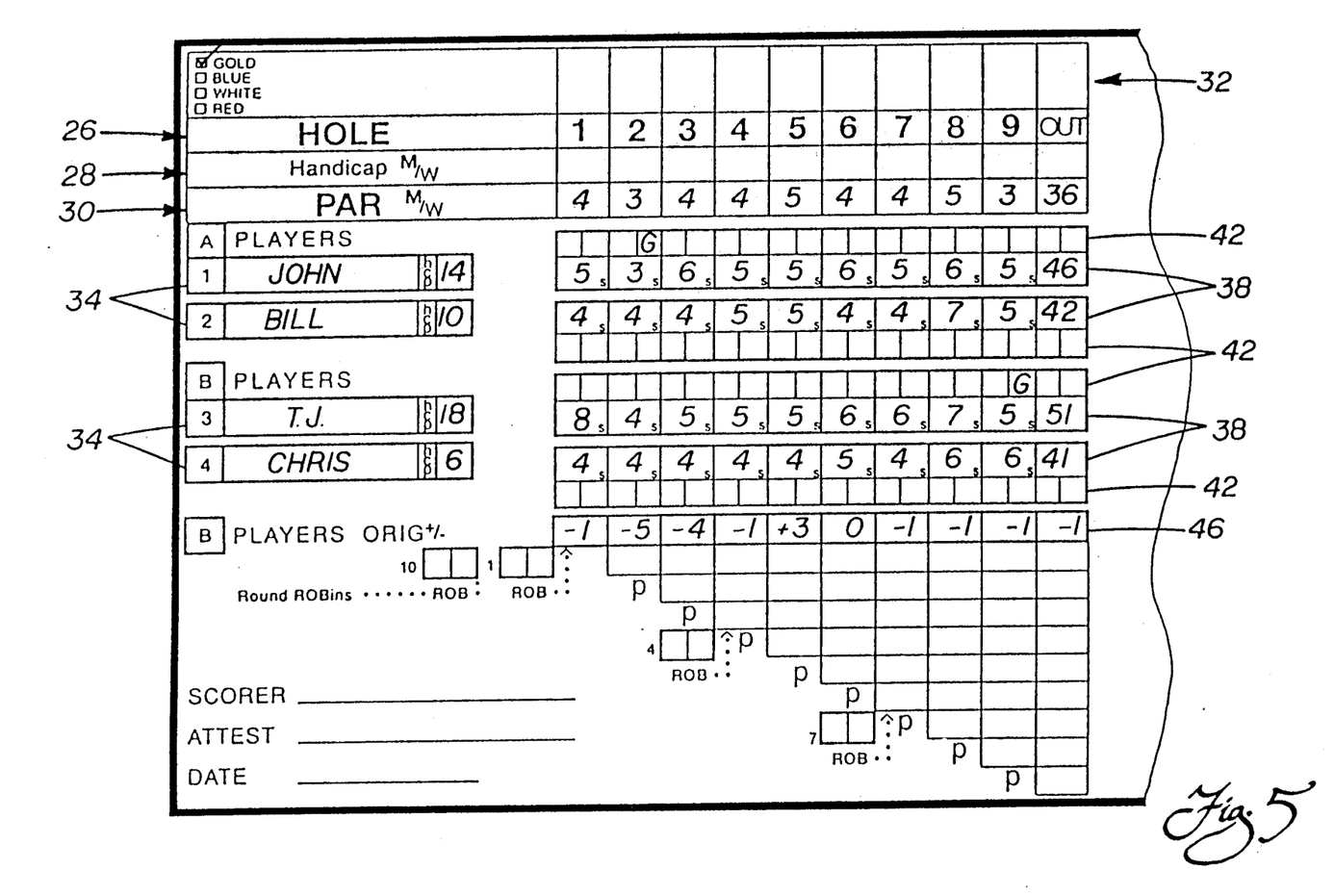

Scorekeeping for the game of scotch is illustrated in FIG. 5. In the game of scotch, which is also known as Chicago or five points in certain areas of the country, two game points are awarded for low ball, one game point is awarded for low total, one game point is awarded for reaching the green in a single shot and being closest to the pin on par 3s and one game point is awarded for natural birdies (that it is one low stroke less than par). Accordingly, there is a maximum of 5 points per hole that may be won or lost. The point total is maintained in the row of team original game point blocks 46 with the numbers shown reflecting the position of the B team during the game: that is, plus numbers mean the B team is winning by that number of points and negative numbers mean the B team is losing by that number of points. On the first hole of play, each team has a low stroke total of 4 for an individual and accordingly, no points are awarded on that hole for low ball. The A team does, however, earn a point for a low total (i.e. 9 strokes versus 12 strokes). None of the players reached the green in one shot and accordingly, no points are awarded for reaching the green. Additionally, the hole is a par 4. Since none of the players scored a 3 on the hole, no points are awarded for birdies. Accordingly, the B team is down 1 point to the A team sine the A team earned a point for low total and a negative 1 is written in the first team original game point block.

On the second hole, John's tee shot came to rest on the green closest to the hole. A g representing a "greenie" may be marked in the game point block corresponding to John playing hole 2. Additionally, team A is awarded a game point for this greenie. Team A is also awarded 2 points for low ball since neither member of team B can tie or beat John's 3 stroke total. Additionally team A is awarded 1 point for low total as the 7 stroke total of the two players of team A is one stroke less than the 8 stroke total for the two players of team B. Once again, since there were no birdies, no points are awarded for natural birdies. Accordingly, team A won four game points on the second hole and team B won none. The four game points team B is down on the second hole are then added to the one team point team B was already down on the first hole and −5 is marked in the second team original game scoring block. Scoring continues in this manner through the entire number of holes and the final total game points are marked in the last team original game scoring block. In the nine hole example shown in FIG. 5, team A won by one game point over team B.

Figure 6:
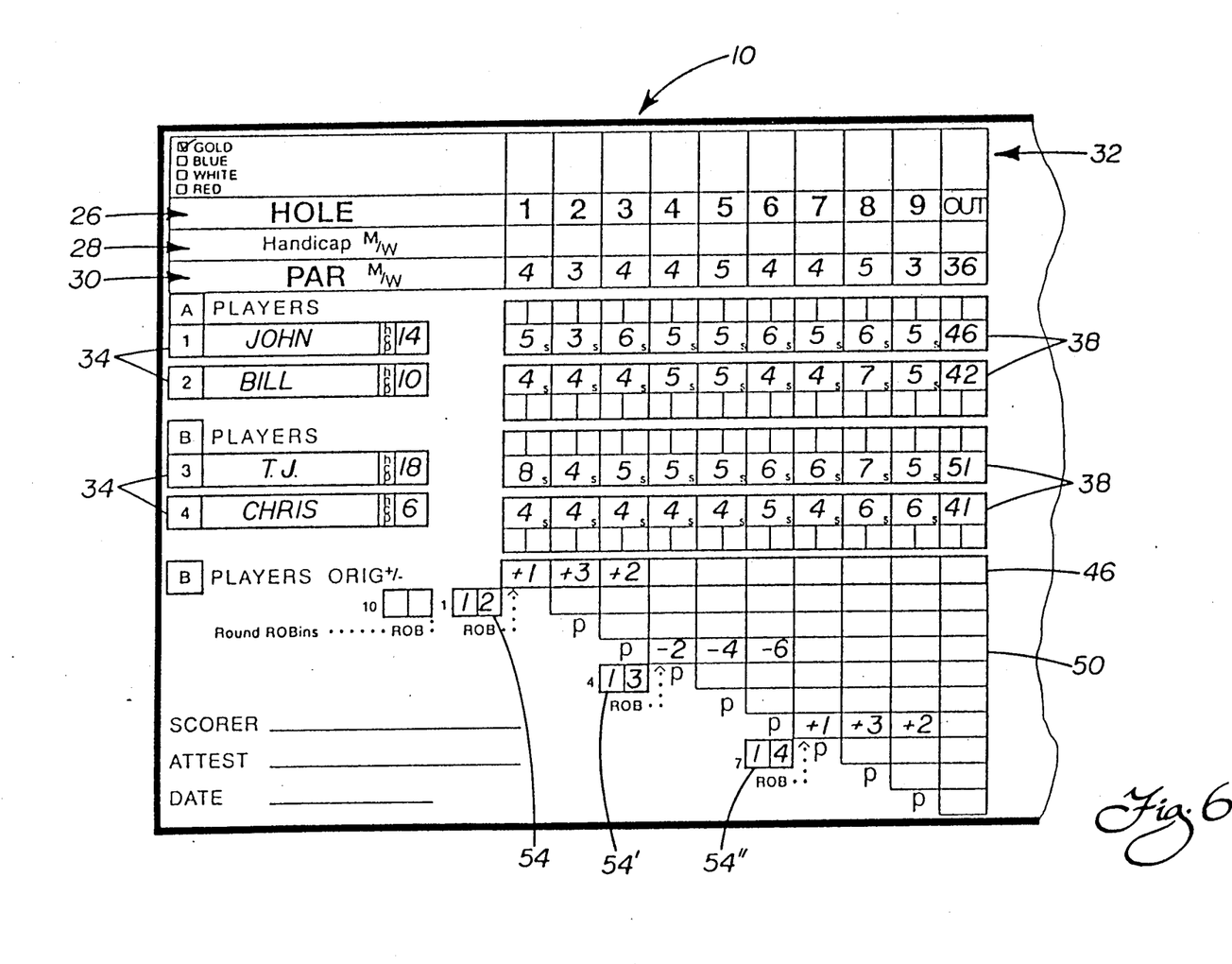

An example to demonstrate utilization of the golf scorecard 10 of the present invention for scoring a round-robin in shown in FIG. 6. In round-robins three 6-hole robins may be played during an 18 hole round with all players being paired once. In this instance the pairings change on holes 7 and 13. Alternatively, six 3-hole robins may be played during an 18 hole round. Since only nine holes of round-robin are being shown in FIG. 6, the three hole robin pairings are used in the example with the matched pair switching on holes 4 and 7. Round-robin points can be scored by low ball, low ball/low total, or scotch. For demonstration purposes one game point will be scored for low ball/low total. As shown, the first of the round-robin blocks 54 is marked with numbers 1 and 2. This indicates that the number 1 and 2 players John and Bill are paired together as a team for the playing of the first 3 holes. Consequently, TJ and Chris are also paired together for these three holes. The scoring for the low ball and low total game points for the first three holes is completed in the manner discussed above so that at the end of three holes, John and Bill are 2 game points ahead of the team of TJ and Chris.

The numbers 1 and 3 are filled in the round-robin box 54'. This indicates that for holes 4, 5, and 6 John and TJ will be matched as one team and Bill and Chris will be matched as the second team. On the fourth hole Bill and Chris win a game point for low ball as well as a game point for low total. Accordingly, a −2 is recorded in the scoring block 60. This represents that the team of John and TJ (i.e. the number appearing in the round-robin block 54′) are two game points down following the playing of the fourth hole. The scoring for low ball and low total continues with this particular pairing of teams for holes 5 and 6 with the nd result that John and TJ lose to the team of Bill and Chris by a total of 6 game points.

The numbers 1 and 4 are marked in the round-robin block 54″. This indicates that John and Chris will be paired as a team for playing holes 7, 8 and 9 against the team of Bill and TJ. On hole 7 both teams tie with a low ball score of 4. Accordingly, no point is awarded for low ball. A game point is, however, awarded for low total as the team of John and Chris edge out the team of Bill and TJ by a score of 9 strokes to 10 strokes. Accordingly, a +1 is marked in the scoring box 62 to indicate that the team of John and Chris have a 1 game point lead over the team of Bill and TJ. The scoring continues in the same manner for the final three holes with the result that John and Chris beat the team of Bill and TJ by two game points. The same procedure may, of course, be followed in playing the back nine.

In summary, numerous benefits have been obtained by employing the concepts of the present invention. Advantageously the unique design of the golf scorecard 10 of the present invention with the systematic positioning of the 298 game blocks, 88 game letters and 4 handicap blocks brings to the golfing world a scoring instrument that allows the golfer a predesignated, organized system of game scoring. Such a standardized scoring system has not been available with any traditional golf scorecard. Accordingly, golfers can quickly and unmistakenly determine their team or individual point standing in each game being played on any given hole during the round of golf. The information can be rapidly entered on the card and game scoring quickly reviewed so as to speed the overall play of the golf group. As a further advantage, it may be realized that the golf scorecard has been maintained in a compact design. More particularly, the card has a dimensional size corresponding to a traditional golf card. Thus the golf scorecard 10 of the present invention may be easily placed on a golfcart clipboard or carried in a golfer's pocket during the playing of a round of golf.

The foregoing description of the preferred embodiment of the present invention has been presented for purposes of illustration and description. It is not intended to be exhaustive or to limit the invention to the precise form disclosed. Obvious modifications or variations are possible in light of the above teachings. The embodiment was chosen to provide the best illustration of the principles of the present invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably titled.

I claim:

1. A golf scorecard for recording individual and team stroke totals as well as individual and team game point totals, comprising:
   sheet material for receiving indicia;
   n rows of score boxes formed on said sheet for recording individual player stroke totals, one score box being provided for each hole of a golf course being played;
   n rows of individual game point blocks formed on said sheet for recording individual player game totals wherein n is an integer; and
   a plurality of m, wherein m is an integer, skin recording means, one recording means provided in each score box, marking of any skin recording means indicating the corresponding player has won a skin on the corresponding hole.

2. The scorecard set forth in claim 1, further including r, wherein r is an integer round-robin blocks, marking of said round-robin blocks indicating pairings of playing partners for a particular set of holes.

3. The scorecard set forth in claim 1, further that include golf course identification blocks which include a numerical listing of the individual holes of the golf course being played as well as additional information for each hole setting forth the overall distance from tee to green, par and handicap.

4. The scorecard set forth in claim 1, further including four player identification blocks, one row of score boxes being aligned with each player identification block.

5. The scorecard set forth in claim 4, including a handicap block adjacent each player identification block for recording a player's handicap.

6. A golf scorecard for recording individual and team stroke totals as well as individual and team game point totals, comprising:
   sheet material for receiving indicia;
   n, wherein n is an integer, rows of score boxes on said sheet for recording individual players stroke scores, one score box being provided for each hole of a golf course being played;
   n, wherein n is an integer, rows of individual game point blocks formed on said sheet for recording individual player game points;
   a row of original game point blocks formed on said sheet for recording game points for an original game;
   m, wherein m is an integer, skin recording means one skin recording means provided in each score box, marking of any skin recording means indicating the corresponding player has won a skin on the corresponding hole.

7. The scorecard set forth in claim 6, further including a plurality of p wherein p is an integer rows of team new game point blocks formed on said sheet for recording team game points for each new game.

8. The device set forth in claim 6, further including a plurality of q, wherein q is an integer, press recording means, one press recording means positioned adjacent a first block of each row of team new game point blocks, marking of any press recording means indicating that a press begins a new game.

9. The scorecard set forth in claim 6, further including r, wherein r is an integer round-robin blocks, marking of said round-robin blocks indicating pairings of playing partners for a particular set of holes.

10. The scorecard set forth in claim 6, further including four player identification blocks, one row of score boxes being aligned with each player identification block.

11. The scorecard set forth in claim 10, including a handicap block adjacent each player identification block for recording a player's handicap.

12. The scorecard set forth in claim 10, further include golf course identification blocks which include a numerical listing of the individual holes of the golf course being played as well as additional information for each hole setting forth the overall distance from tee to green, par and handicap.

13. A golf scorecard for recording individual and team game point totals, comprising:
wherein n, m, p and q are integers;
sheet material for receiving indicia;
n rows of score boxes on said sheet for recording individual players stroke scores, one score box being provided for each hole of the golf course being played;
n rows of individual game point blocks formed on said sheet for recording individual player game points;
a row of original game point blocks formed on said sheet for recording team game points for an original game;
m skin recording means, one skin recording means provided in each score box, marking of any skin recording means indicating the corresponding player has won a skin on the corresponding hole;
p rows of team new game point blocks formed on said sheet for recording team game points for each new game;
q press recording means, one press recording means positioned adjacent a first block of each row of team new game point blocks, marking of any press recording means indicating that a press begins a new game.

14. The scorecard set forth in claim 13, further including r, wherein r is an integer round-robin blocks, marking of said round-robin blocks indicating pairings of playing partners for a particular set of holes.

15. The scorecard set forth in claim 13, further including four player identification blocks, one row of score boxes being aligned with each player identification block and including a handicap block adjacent each player identification block for recording a player's handicap.

16. The scorecard set forth in claim 13, further that includes golf course identification blocks which include a numerical listing of the individual holes of the golf course being played as well as additional information for each hole setting forth the overall distance from tee to green, par and handicap.

17. A method of recording individual and team stroke totals as well as individual and team game point totals on a golf scorecard including a plurality of rows of recording spaces comprising the steps of:
marking on a first row of recording spaces on said scorecard an individual's stroke total for a hole or holes played;
marking on a second row of recording spaces on said scorecard an individual's game point total for a hole or holes played;
marking on a third row of recording spaces on said scorecard a team's game point total; and
marking a recording means provided on said scorecard to indicate skins won and presses made by a player.

* * * * *